UNITED STATES PATENT OFFICE.

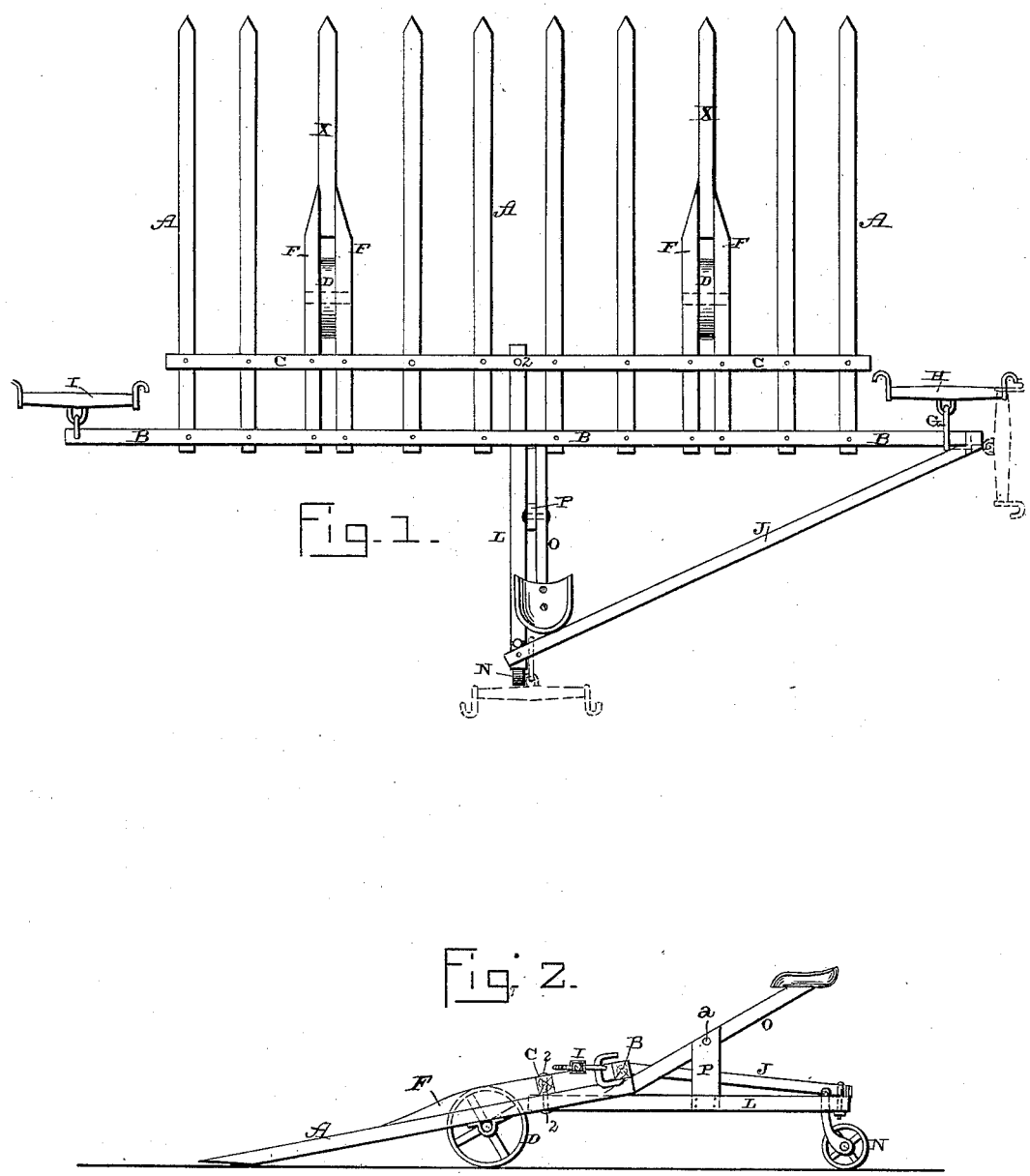

OBED H. KING, OF HOUGHTON, IOWA.

HORSE HAY-RAKE.

SPECIFICATION forming part of Letters Patent No. 405,484, dated June 18, 1889.

Application filed November 22, 1888. Serial No. 291,537. (No model.)

*To all whom it may concern:*

Be it known that I, OBED H. KING, of Houghton, in the county of Lee and State of Iowa, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to an improvement in horse hay-rakes; and it consists in, first, the combination of short teeth, bars secured to the rear ends of these teeth and to the two stringers, and supporting-wheels journaled between these bars in advance of the stringers, so as to balance the rake; second, the combination of the rake, a seat-beam which is pivoted at its front end to the under side of the front stringer and which extends backward under the rear stringer and is supported at its rear end by a caster-wheel with the seat-bar, to which the seat is attached, and a post which is pivoted both to the seat-beam and to the seat-bar; third, the combination of the rake, a diagonal brace which is connected both to one of the outer ends of the rear stringer and to the seat-beam, and a loop to which the singletree is attached, the loop being adapted to be moved from the end of the rear stringer to the diagonal brace, or vice versa, as will be more fully described hereinafter.

The objects of my invention are to journal the supporting-wheels of the rake in advance of the stringers, so that the rake can be readily and easily balanced, and thus made easier to move about when loaded; to attach the seat-beam to the forward stringer and then connect the seat-bar to the seat-beam through a post or support, so that the weight of the driver will raise the rear end of the rake and force the points of the teeth close to the ground, and to attach the singletree to a loop which is adapted to be shifted from the extended end of the stringer, when the rake is to be drawn backward, to a diagonal brace between the beam and the stringer, along which the loop slides to the joint between the beam and the brace at center of the rear of the rake, and thus enable the horse to draw the rake directly backward.

Figure 1 is a plan view of a rake which embodies my invention. Fig. 2 is a side elevation of the same.

A represents the rake-teeth, all of which, with the exception below noted, are secured together at their rear ends by the two stringers B C, both of which extend across the tops of the rear ends of the teeth, which may be recessed or cut away at their rear ends, so that the stringers will be just flush with the tops of the teeth, and thus offer no obstruction to the backward movement of the hay while the rake is being loaded. The two teeth X are only about one-half the length of the other teeth, and are rigidly secured at their rear end between the front ends of the bars F. These bars F are rigidly secured at their rear ends to the two stringers B C, and are separated a sufficient distance to allow the wheels D to be journaled between them in advance of the stringers, the boxes for the shafts of the wheels being preferably secured to the under sides of the bars, as shown. The wheels are placed in the openings between the bars F at such a point that the rake is easily balanced when loaded. If the upper edges of the wheels are made to project above the tops of the bars F, suitable guards should be placed over the tops of the wheels, so as to prevent the hay from catching in them; but where the wheels do not extend above the top edge of the bars F no guards are necessary.

The ends of the stringer B project beyond the outer rake-teeth, so that the draft-animals can be attached to them in the usual manner. At one end the singletree I for the draft-animal is connected to the end of the stringer in the usual manner; but at the other end the singletree H is connected to a loop G, which is made sufficiently long to allow the animal attached to the singletree H, when turned around, to cause the loop G to slip from the end of the stringer B upon the diagonal brace J, which extends backward to the center of the rake and has its rear end secured to the beam L. The loop G slips along this diagonal brace J until it comes in contact with the beam L, when by starting up the horse the pull backward is exerted directly at the center of the rake, and thus the rake can be drawn straight backward from under the load. By this construction in moving the rake backward it is more readily and easily guided than where the horses are attached to opposite corners, in the usual manner. By attaching this singletree to the loop G it is only necessary to turn the horse around, when the loop passes to the diagonal brace without any trouble on the part of the operator.

The beam L is supported at its rear end by a caster-wheel N, and has its front end to extend forward under the stringer B without being connected to it, and is pivoted at its extreme front end to the under side of the stringer C at 2. This pivot allows enough movement between the parts to have the rake turn upon the journals of the wheels and balance itself after it is loaded, so that the front ends of the teeth will be kept out of contact with the ground. No connection is made between this beam L and the rear stringer B, because the beam L is intended to act as a lever for the purpose of depressing the front end of the rake-teeth and causing them to hug closely to the ground while the rake is being drawn forward for the purpose of being loaded. Catching under the rear stringer B is the front end of the seat-bar O, to the upper end of which the driver's seat is secured, and which bar is pivoted at $a$ to the upper end of the post or support P, which is rigidly secured at its lower end to the beam L. When the driver mounts upon his seat, his weight is transferred through the bar O to the under side of the stringer B, and this bar raises the rear end of the rake, so as to depress the teeth A at their front ends. When the rake is loaded or is not in use and it is desired to have the front ends of the teeth A elevated, the driver does not ride upon the seat upon the bar O, but rides upon some other portion of the rake.

When the rake is loaded or unloaded, owing to the location of the wheels D in front of the stringers, the weight of the front end of the beam L serves to raise the front ends of the teeth, so that they will not come in contact with the ground by depressing the whole rear portion of the rake until the rear stringer B strikes against the top of the beam L. It is only when the driver is mounted upon his seat that the front ends of the teeth are depressed, and this result is obtained by locating the wheels in advance of the stringers.

Having thus described my invention, I claim—

1. In a rake, the combination, with the teeth having suitable transverse beams rigidly connecting their rear ends and supporting-wheels journaled in the rake-frame in advance of the transverse beams, of a rearwardly-extending beam having its front end loosely connected to the frame in the rear of the wheels, a supporting-wheel at its rear end, and an operating-bar pivoted upon the said beam having a seat upon its rear end and its front end engaging the rake-frame back of the supporting-wheels, whereby the rake automatically balances itself and the points of the teeth are forced down by the weight of the driver, substantially as shown and described.

2. The combination, with the hay-rake provided with the stringer B, which has its ends to project beyond the sides of the teeth, of the diagonal brace J, a seat-beam L, with the loop, and the singletree H, whereby the draft at one end of the stringer B can be transferred from that end of the stringer B to and along the diagonal brace J, substantially as set forth.

In testimony whereof I affix my signature in presence of two witnesses.

OBED H. KING.

Witnesses:
JAMES A. EVANS,
J. B. ROSE.